May 21, 1963     A. B. C. RANKIN     3,090,224
ULTRA-SONIC FLAW DETECTION
Filed April 21, 1959
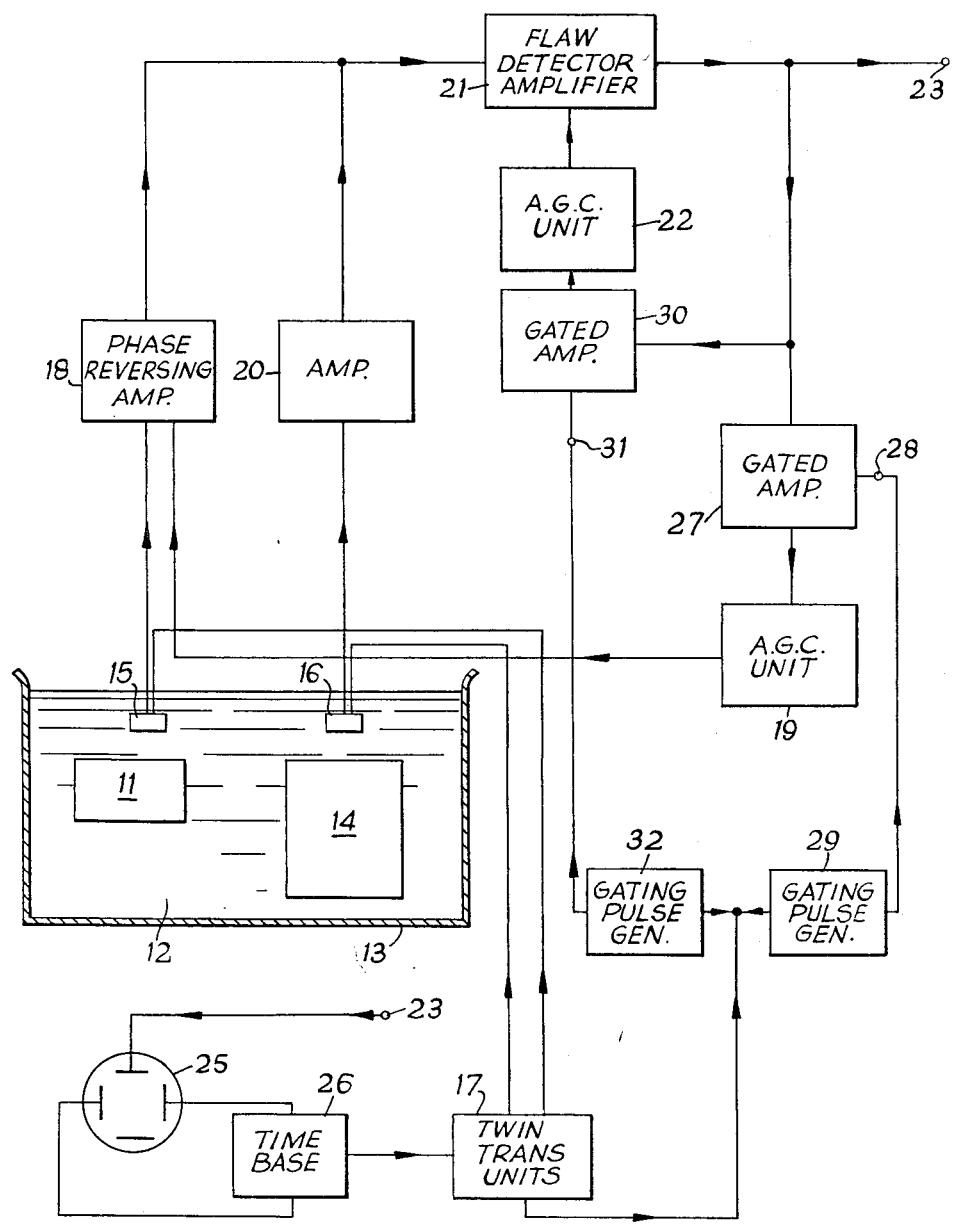
INVENTOR
A.B.C. RANKIN
BY
Moon & Hall
ATTORNEY united States Patent Office 3,090,224
Patented May 21, 1963

3,090,224
ULTRA-SONIC FLAW DETECTION
Alexander Bryce Calder Rankin, Barkingside, England
Filed Apr. 21, 1959, Ser. No. 807,864
3 Claims. (Cl. 73—67.9)

The present invention relates to ultrasonic flaw detection apparatus of the type in which a workpiece to be tested is immersed in a liquid together with a transducer or transducers adapted to inject ultrasonic waves into and receive echo waves from said workpiece.

It is usual for common transmit/receive transducers to be employed although it will be understood that separate transmitting and receiving transducers may if desired be employed.

In apparatus of this type which has been proposed a common T.-R. transducer is employed to inject pulsed ultrasonic waves into the workpiece, the transducer being spaced from said workpiece. Signals picked up by the transducer comprise, in the order named, a transmission mark (occurring at the time of transmission of a pulse), an interface echo of said pulse (arising from the interface between the liquid and the workpiece), any flaw echoes, a first bottom echo, and a series of further bottom echoes of progressively decreasing amplitude produced by waves reflected from the upper surface of the workpiece back to the bottom and possibly flaw echoes between the multiple bottom echoes. The signals picked up by the transducer are applied to a display device, usually a cathode ray tube, and it is arranged that only the signals between and including the interface echo and the first bottom echo are displayed.

The length along the time base of the display of the interface echo will, of course, depend upon the length (that is the duration) of the transmitted pulse and the longer this pulse the greater the range of depths measured from the interface over which flaw echoes will be obscured by the interface echo. Moreover the use of flaw detection apparatus employing gated amplifiers is limited to that part of the display that lies between the end of the interface echo and the beginning of the first bottom echo.

It is evident, therefore, that the length of the interface echo, and/or its amplitude, should be reduced as much as possible: ideally this echo would be eliminated.

There are limitations on the extent to which the transmitted pulse length can be reduced. It is possible to use pulses having a duration of four or five cycles of the ultrasonic wave but the frequencies of the wave that can be employed may be limited. Although with certain materials, such as aluminium alloys, a frequency of 25 mc./s. has been used, for most purposes frequencies in the neighbourhood of 2½ mc./s. are found to be desirable, in order to avoid effects caused by elastic anisotropy, particularly by scatter arising at grain boundaries.

The present invention has for its object to provide ultrasonic flaw detection apparatus of the type specified in which the magnitude of the interface echoes is substantially reduced and in which, therefore, the detection of flaws close to the surface of a workpiece is facilitated.

According to the present invention there is provided ultrasonic flaw detection apparatus of the type specified, comprising a first transducer arranged in a liquid container and adapted to receive echoes from a workpiece to be tested within the liquid container, a second transducer arranged in said liquid container or in a second liquid container and adapted to receive echoes from a dummy workpiece therein, and signal combining means for combining the electrical output signals in opposition and applying the combined signal to a display or recording device. The two transducers may be mounted in opposite polarity or the signal from one may be passed through a phase reversed amplifier with a gain of unity.

The distance between the two transducers and their workpieces are made equal and the thickness of the dummy (in the direction of wave transmission) is made greater than that of the workpiece under test and such that the first bottom echo from the dummy workpiece is outside the range to be displayed or recorded.

Since the amplitude of the interface echo is determined by the relative acoustic impedance of the liquid and the workpiece, the dummy workpiece is arranged to have the same specific acoustic impedance as the workpiece under test. The two transducers should have as nearly as possible the same characteristics.

In some cases difficulty may arise with the apparatus according to the invention as set forth owing to variations in sensitivity arising from turbulence of the water or other liquid used, variations in the degree of aeration, and variations in the wetting of the surfaces of the test and dummy workpieces.

In a preferred embodiment of the invention, therefore, there are provided control means for selecting a part of the combined signal resulting from the combination of the interface echo signals and applying said part of the combined signal to control automatically the amplitude of one of the said output signals from the transducers in such a manner as to reduce the amplitude of said signal part.

The part selected may be the first cycle of the wave of which the pulse is formed and the selection may be performed by a gated amplifier. The output of this amplifier may be rectified and used as an automatic gain control voltage for an amplifier associated with one of the transducers.

An embodiment of the invention will now be described by way of example with reference to the accompanying drawing which is a block schematic diagram of the embodiment.

Referring to the drawing, a workpiece 11 to be tested for flaws is immersed in a liquid 12 in a container 13, together with a dummy workpiece 14 and two transmit/receive transducers 15 and 16. The workpiece 11 and the dummy workpiece 14 are of the same material and in the present embodiment so disposed that their upper surfaces lie in a common plane. The dummy workpiece is however of considerably greater depth than the workpiece 11. The transducer 15 is immersed in the liquid above the workpiece 11 and the transducer 16 likewise immersed in the liquid above the dummy workpiece 14. The arrangement is such that the distance between the transducer 15 and the workpiece 11 is exactly equal to that between the transducer 16 and the dummy workpiece 14.

The two transducers 15 and 16 are fed with electric pulsed ultrasonic wave signals from twin transmitter units of the thyratron type arranged to fire at the same instant. Where the transducers used are common T.-R. transducers as in the present embodiment, it is necessary to use twin transmitter units in order to separate the two sets of detected signals. If separate transmitter and receiver transducers are used, then a common transmitter can be used. Signals thus fed to the transducers 15 and 16 are transmitted through the liquid and into the workpieces 11 and 14 as pulsed ultrasonic sound waves. Waves reflected from the boundaries of the workpieces and any flaws within the workpiece 11 are picked up by the transducers and appear in the output circuits of the transducers as echo signals. Signals picked up by the transducer 15 include the transmission pulse, an upper boundary echo pulse reflected from the upper surface of the workpiece 11, flaw echo pulses, if any, a first bottom echo pulse reflected from the lower surface of the workpiece 11 and a series of further bottom echo and flaw echo pulses resulting from multiple internal reflections. Signals picked up by the transducer 16 include the transmission pulse, an upper boundary echo pulse reflected from the upper surface of the dummy workpiece 14, a first bottom echo pulse and a series of further bottom echo pulses resulting from multiple internal reflections in the dummy.

The signals picked up by the transducer 15 are applied to a phase-reversing pre-amplifier 18, the output level of which is controlled by a bias voltage applied thereto from an automatic gain control unit 19. The signals picked up by the transducer 16 are applied to a pre-amplifier 20. The amplified output signals from the amplifiers 18 and 20 are combined and applied to a flaw-detector radio frequency amplifier 21, the output level of which is controlled by a bias voltage applied thereto from an automatic gain control unit 22. Sensitivity control means 22 is responsive to a bottom echo signal from the transducer 15 associated with workpiece 11 to be tested to vary the combined signal in such a manner as to maintain said amplitude substantially constant. The output of the amplifier 21 is fed to an output terminal 23 from which it is applied to the vertical-deflection plates of a cathode ray display tube 25.

The horizontal deflection of the beam of the tube 25 is controlled by signals applied to the horizontal-deflection plates from a time-base generator 26.

The time-base generator 26 also serves to trigger the twin transmitter units 17. In the present embodiment the generator 26 is of the Miller run-down type and the transmitter units 17 are triggered by means of a diode pick-off operating at a suitable point on the Miller linear run-down waveform of the generator 26.

It will be appreciated that the output signals from the transducers 15 and 16 are combined in opposition and that the upper boundary echo signals appear simultaneously at the input of the amplifier 21 and cancel each other. Although the arrangement is made as symmetrical as possible, variations in sensitivity arising from turbulence of the liquid used, variations in the degree of aeration, and variations in the wetting of the surfaces of the workpieces may give rise to variations in the amplitudes of the upper boundary echo signals. Cancellation of the signals one against the other is then not possible. To overcome this, a feedback arrangement now to be described is provided.

The amplified combined signal from the amplifier 21 is applied to a gated amplifier 27, gated by a gating signal applied to terminal 28 and derived from a gating pulse generator 29, hereinafter referred to. The gating signal is such as to initiate the gated amplifier prior to the first cycle of the wave forming the upper boundary echo signal and to block the amplifier 27 immediately after the first cycle. The gating signal is of greater duration than that of the first cycle of the upper boundary echo wave, commencing at a predetermined time prior to the commencement of the upper boundary echo wave. The output of the gated amplifier 27 is applied to the automatic gain control unit 19, which generates a D.C. biasing voltage the magnitude of which varies in accordance with the amplitude of the output from the gated amplifier 27. As hereinbefore stated this D.C. biasing voltage is applied to control the output level of the amplifier 18.

It will first be assumed that the amplitudes of the upper boundary echo signals in the outputs from the amplifiers 18 and 20 are exactly equal. Upon combination, they cancel each other and no signal is passed by the gated amplifier 27. The bias voltage from the unit 19 remains constant.

When, however, for reasons hereinbefore set forth the amplitude of say the upper boundary echo signal from the transducer 15 exceeds that of the upper boundary echo signal from the other transducer 16, the two signals do not completely cancel each other and a residual signal appears in the combined signal at the output of the amplifier 21.

The first cycle of this residual signal is passed by the gated amplifier 27, and is applied to the unit 19. The unit 19 is such that the bias voltage generated thereby changes in a sense such as to reduce the output level from the amplifier 18, and thereby reduce the amplitude of the larger upper boundary signal from the transducer 15 relatively to that of the other from the transducer 16. Similarly, when the upper boundary echo signal from transducer 15 is less than that of the upper boundary echo signal from the other transducer 16, the two signals again do not cancel each other and, under these circumstances, the bias voltage varies in an opposite sense from that just described so as to increase the output level from the amplifier 18, and thereby again reduce the amplitude of the larger echo signal with respect to the other smaller echo signal.

A sensitivity-compensating arrangement now to be described is also provided. The arrangement comprises a gated amplifier 30 fed with signals from the output of the amplifier 21 and gated by a gating signal applied to terminal 31 and derived from a gating pulse generator 32, hereinafter referred to. This gating signal is such as to initiate the gated amplifier 30 prior to the first bottom echo signal and to block the gated amplifier 30 immediately after the first bottom echo signal. The output from the gated amplifier 30 is applied to an automatic gain control unit 22 adapted to generate a D.C. bias voltage the magnitude of which varies in accordance with the deviation of the amplitude from a predetermined level of the gated first bottom echo signal. The D.C. bias voltage is applied to control the gain of the amplifier 21 and the arrangement is such as to maintain a constant amplitude first bottom echo signal at the output of the amplifier 21.

Each of the gating pulse generators 29 and 32 includes a monostable multivibrator triggered by a short duration pulse derived from a diode pick-off responsive to the output of the time-base generator 26 and operating at a position which is continuously variable in time upon the Miller run down waveform. The multivibrator of each of the generators 29 and 32 produces a square wave output which is applied to the associated gated amplifier.

Since the feedback arrangement for eliminating the upper boundary echo signal is dependent upon the first cycle only of the echo signal it is clearly important to arrange that the pulse waveform used remains substantially constant.

It will be appreciated that for efficient operation the feedback arrangements, in particular, the arrangement for eliminating the upper boundary echo signal, should have a response fast enough to take care of variations in amplitude of the echo signals resulting from variations in acoustic couplings.

While there have been described above what are presently believed to be the preferred forms of the invention, variations thereof will be obvious to those skilled in the art, and all such changes and variations which fall within the spirit of the invention are intended to be covered by the generic terms in the appended claims, which are variably worded to that end.

I claim

1. Ultrasonic flaw detection apparatus for detecting flaws in a test work piece by comparison with a dummy work piece, comprising in combination container means for liquid, first and second electromechanical vibration transducer means arranged in said container means to transmit pulses of ultrasonic wave energy through liquid to be contained in said container means and to receive echo signals, said container means also being adapted to contain a test work piece and a dummy work piece immersed in the liquid at equal depths below said first and second transducer means respectively, pulse generating means for energizing said first and second transducer means, resultant signal producing means coupled to said first and second transducer means to provide a combined output signal by combining the outputs of said first and second transducer means in opposition to effect cancellation of unwanted echo signals from the front surfaces of the work piece, said resultant signal producing means comprising gain controlled amplifying means coupled to one of said first and second transducer means, a second pulse generator means, and gating means responsive to the combined output signal when made operable in response to a signal from said second pulse generating means, said second pulse generating means actuated by the first pulse generating means and connected to the gating means to actuate the gating means at a time to select the portion of the combined output signal corresponding to echoes from the front surfaces of the work piece and gain control means comprising said gating means coupled to said gain controlled amplifying means to vary the gain of said amplifying means in accordance with the magnitude of the selected echo signal.

2. The combination set forth in claim 1, a radio frequency amplifier connected to said resultant signal producing means for amplifying said combined output signal, a sensitivity-compensating feed-back circuit means comprising gated amplifier means connected to receive said combined output signal and gain control means controlled by said gated amplifier means and connected to vary the gain of said radio frequency amplifier in accordance with the magnitude of a selected portion of said combined output signal to maintain said magnitude within desired limits, a third pulse generator actuated by said first pulse generator and connected to the gated amplifier to actuate said gated amplifier at a time corresponding to a selected echo signal from the bottom surface of one of the work pieces.

3. The combination set forth in claim 1, said gating means and said second pulse generating means being so constructed that a gating signal is supplied to said gating means to select only the first cycle of said combined output signal, said second pulse generating means being operable to block said gating means immediately thereafter.

References Cited in the file of this patent

UNITED STATES PATENTS 2,618,968 McConnell _____ Nov. 25, 1952

FOREIGN PATENTS 715,143 Great Britain _____ Sept. 8, 1954
545,400 Belgium _____ Mar. 15, 1956